United States Patent
Kümmlee et al.

(10) Patent No.: US 11,411,475 B2
(45) Date of Patent: Aug. 9, 2022

(54) METHOD FOR PRODUCING A ROTOR FOR AN ELECTRIC ROTATING MACHINE

(71) Applicant: Siemens Aktiengesellschaft, Munich (DE)

(72) Inventors: Horst Kümmlee, Berlin (DE); Frank Seibicke, Borkheide (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/276,010

(22) PCT Filed: Sep. 17, 2019

(86) PCT No.: PCT/EP2019/074803
§ 371 (c)(1),
(2) Date: Mar. 12, 2021

(87) PCT Pub. No.: WO2020/064413
PCT Pub. Date: Apr. 2, 2020

(65) Prior Publication Data
US 2022/0045581 A1     Feb. 10, 2022

(30) Foreign Application Priority Data
Sep. 28, 2018   (EP) .................... 18197407

(51) Int. Cl.
*H02K 15/00* (2006.01)
*H02K 15/12* (2006.01)
*H02K 17/16* (2006.01)

(52) U.S. Cl.
CPC ......... *H02K 15/0012* (2013.01); *H02K 15/12* (2013.01); *H02K 17/165* (2013.01)

(58) Field of Classification Search
CPC ..... H02K 15/0012; H02K 17/16; H02K 17/18
USPC ..................... 310/125, 156.78, 211
See application file for complete search history.

(56) References Cited

U.S. PATENT DOCUMENTS

| | | | |
|---|---|---|---|
| 2004/0155551 | A1 | 8/2004 | Mawardi |
| 2004/0202797 | A1 | 10/2004 | Ginder et al. |
| 2010/0102666 | A1 | 4/2010 | Kaiser et al. |
| 2011/0289765 | A1 | 12/2011 | Bohn et al. |
| 2011/0316380 | A1 | 12/2011 | Buttner et al. |

(Continued)

FOREIGN PATENT DOCUMENTS

| | | |
|---|---|---|
| CN | 102318169 A | 1/2012 |
| CN | 102738988 A | 10/2012 |

(Continued)

OTHER PUBLICATIONS

PCT International Examination Report and Written Opinion of International Examination Authority dated Sep. 8, 2020 corresponding to PCT International Application No. PCT/EP2019/074803 filed Sep. 17, 2019.

*Primary Examiner* — Quyen P Leung
*Assistant Examiner* — Minki Chang
(74) *Attorney, Agent, or Firm* — Henry M. Feiereisen LLC (57) ABSTRACT

A method for producing a rotor for an electric rotating machine includes spraying in a rolling manner a first metallic material and a second metallic material, which is different from the first metallic material, onto at least part of a substantially cylindrical outer surface of a shaft body by a thermal spraying method to form on the shaft body a coating which forms at least part of a squirrel cage.

19 Claims, 4 Drawing Sheets

(56) References Cited

U.S. PATENT DOCUMENTS

| | | |
|---|---|---|
| 2012/0248901 A1* | 10/2012 | Maeda ............... H02K 15/0012 310/44 |
| 2013/0049518 A1 | 2/2013 | Kleber et al. |
| 2013/0106233 A1 | 5/2013 | Hanamachi |
| 2015/0349616 A1 | 12/2015 | Buttner et al. |
| 2016/0105086 A1 | 4/2016 | Bethge et al. |
| 2016/0186603 A1 | 6/2016 | Robb et al. |
| 2020/0072079 A1 | 3/2020 | Robb et al. |

FOREIGN PATENT DOCUMENTS

| | | | |
|---|---|---|---|
| CN | 103795195 A | 5/2014 | |
| CN | 105305752 A | 2/2016 | |
| CN | 107408849 A | 11/2017 | |
| DE | 102005056823 A1 | 5/2007 | |
| DE | 102009053987 A1 | 6/2011 | |
| DE | 102012006248 A1 | 10/2012 | |
| EP | 0264110 A1 | 4/1988 | |
| EP | 2592730 A1 | 5/2013 | |
| EP | 3040384 A1 | 7/2016 | |
| EP | 2979350 B1 | 5/2017 | |
| JP | 2014108006 A | 6/2014 | |
| JP | 5745703 B1 * | 7/2015 | ........... H02K 17/165 |
| RU | 2089989 C1 | 9/1997 | |
| RU | 2498224 C1 | 11/2013 | |
| WO | WO 2016017256 A1 | 2/2016 | |

\* cited by examiner

METHOD FOR PRODUCING A ROTOR FOR AN ELECTRIC ROTATING MACHINE

CROSS-REFERENCES TO RELATED APPLICATIONS

This application is the U.S. National Stage of International Application No. PCT/EP2019/074803, filed Sep. 17, 2019, which designated the United States and has been published as International Publication No. WO 2020/084413 A1 and which claims the priority of European Patent Application, Serial No. 18197407.2, filed Sep. 28, 2018, pursuant to 35 U.S.C. 119(a)-(d).

BACKGROUND OF THE INVENTION

The invention further relates to a rotor for an electric rotating machine, which is produced with a method of this type.

The invention furthermore relates to an electric rotating machine having at least one rotor of this type.

A method of this type is used in particular to produce rotors of rapidly turning electric rotating machines, which are embodied as asynchronous machines, for instance. For instance, a rapidly turning electric rotating machine of this type can be operated with a power of at least 1 megawatt and a rotational speed of at least 5000 rpm, however, the invention is not restricted to machines of this type. A rapidly turning electric rotating machine can be operated as a motor or as a generator, for instance in a compressor or a turbine.

The rotor has at least one magnet pole-generating element, for instance a squirrel cage, a winding or permanent magnets, which have to withstand the centrifugal forces occurring at high rotational speeds.

The unexamined German application EP 2 979 349 A1 describes a method for producing a rotor of an electric machine, wherein the rotor has a rotor core, arranged concentrically with respect to the rotor axis, made from a core material, wherein the rotor core has grooves which run substantially in the axial direction, wherein at the respective axial end of the grooves the rotor core has a ring-shaped cut-out arranged concentrically with respect to the rotor axis, said cut-out connecting the grooves, wherein the rotor core has a diffusion layer which comprises a diffusion material and which at least partially covers at least the respective surface of the grooves and/or the respective ring-shaped cut-out.

The patent application EP 2 979 350 E31 describes a method for producing a rotor of an electric asynchronous machine. In the method, a support shaft is produced with shaft grooves. A squirrel-cage rotor is attached to the support shaft, wherein the support shaft and an electrically conductive bulk material are introduced into a container so that the bulk material fills the shaft grooves. The bulk material is compacted in the container by means of hot isostatic pressing and is connected to the support shaft.

The unexamined German application EP 3 040 384 A1 describes a rotor shaft for a high-speed motor, wherein the rotor shaft comprises a shaft body which is designed for a rotational movement during the operation of the high-speed motor. The shaft body is produced from a steel material. The rotor shaft further has a coating which is fastened to at least one part of an outer surface of the shaft body, wherein the coating is embodied to guide an induced electric current for the rotational movement of the shaft body. The coating is made from an alloy material, wherein the alloy material of the coating and the steel material of the shaft body are different materials.

The unexamined German application DE 10 2012 006 248 A1 describes a squirrel cage rotor and a production method for the same, wherein the rotor has conductors with sufficient strength. In the invention conductor particles are sprayed onto a core and/or conductive bars in a solid body state. As a result, in the cover layer material the enlargement of the crystal grain of the conductor is restricted significantly, as a result of which conductive end rings are connected to the core and/or the conductive bars.

The unexamined German application DE 10 2009 053987 A1 describes a method for producing a compact and/or solid multilayer coil. Dynamic cold spraying is used to create electrically conducting connections between the individual conductor layers embedded in the carrier material, in particular between the individual conductor paths.

The unexamined German application WO 2016/017256 A1 describes an induction motor, which has a rotor with busbars which are contained in slots of a solid iron core. The slots are open slots and have a width which tapers gradually and linearly from the outer peripheral side toward the interior of the rotor.

The unexamined German application EP 0 264 110 A1 describes an electromagnetic arrangement, in particular an electromagnetic winding with conductor windings which are insulated electrically from one another and which are electrically insulated from one another and have the shape of an electrically conductive film. The film can be a metal coating on an electrically insulated plastic film or consist of electrically conductive plastic with an insulation layer between the individual turns of the winding.

The object underlying the invention is to specify a method for producing a rotor for an electric rotating machine which is simpler and more cost-effective in comparison with the prior art.

SUMMARY OF THE INVENTION

This object is achieved according to the invention by a method for producing a rotor for an electric rotating machine with at least one shaft body and a squirrel cage, wherein a coating made from at least one first metallic material and a second metallic material, which is different from the first metallic material, is sprayed by means of a thermal spraying method onto at least part of a substantially cylindrical outer surface of the shaft body, wherein at least part of the squirrel cage is formed by the coating.

Furthermore, the object is achieved according to the invention by a rotor for an electric rotating machine, which has a squirrel cage and is produced with a method of this type.

Furthermore, the object is achieved according to the invention by an electric rotating machine with at least one rotor of this type.

The advantages and preferred embodiments cited below with respect to the method can be transferred analogously to the rotor and the electric rotating machine.

The idea underlying the invention is to optimize the production of a rotor for an electric rotating machine by using a thermal spraying method. Thermal spraying methods are, for instance, arc spraying, plasma spraying or flame spraying. The thermal spraying method is used to spray different metallic materials onto a substantially cylindrical outer surface of a shaft body, wherein a dense and tenacious coating is formed and wherein at least part of a magnet pole-generating element is formed by the coating. A metallic material is, for instance, a metal or an alloy with, in each case, hard magnetic, soft magnetic or nonmagnetic properties. A magnet pole-generating element is, for instance, a squirrel cage, an electromagnet or a permanent magnet. If both metallic materials are sprayed onto the shaft body, a toothing between the materials is improved by forming a material-bonded connection so that the magnet pole-generating element is safeguarded against centrifugal forces which occur during operation, for instance. In particular, compared with the hot isostatic pressing, the number of work steps is significantly reduced by means of the thermal spraying method; this results in production costs being simplified, and manufacturing costs being reduced.

Cold gas spraying is used particularly advantageously as a thermal spraying method. With cold gas spraying, solid body particles, which are accelerated by way of a gas flow, strike the shaft body with high kinetic energy of this type so that a material-bonded connection is produced by way of diffusion mechanisms. With the aid of cold gas spraying, in comparison with other additive manufacturing methods, thick slices, for instance in the millimeter range and in the centimeter range, can be produced in a short time and in a geometrically very flexible manner. Since the material applied by means of cold gas spraying is not melted but instead deformed as a result of its kinetic energy, thermally induced stresses, particularly in the region of the connection, are largely avoided.

In a preferred embodiment, the second metallic material is a soft-magnetic material. Soft-magnetic materials are, for instance, iron or steel, which are suited to guiding a magnetic flux in the interior of the material. If the soft-magnetic material is sprayed together with the first metallic material, the processing of the shaft body is simpler since no grooves have to be milled, for instance. Furthermore, a toothing between the materials is improved by forming a material-bonded connection, so that the magnet pole-generating element is safeguarded against centrifugal forces which occur during operation, for instance.

In a preferred embodiment, the shaft body is produced from a second metallic material. In particular, if the second metallic material is soft-magnetic material, the electrical properties of the rotor are improved, and a simulation of the electrical behavior is simplified. A cost reduction is achieved by reducing the number of materials.

In a further advantageous embodiment, at least part of a squirrel cage is formed by means of the first metallic material. For instance, rods of a squirrel cage are formed from a first metallic material, which is sprayed onto the shaft body together with the second metallic material, wherein short-circuit rings are connected to the short-circuit rods at the axial ends thereof. A squirrel cage of this type can be produced easily and cost-effectively.

In a preferred embodiment, the squirrel cage is embedded completely into the rotor. In particular, both short circuit rings with the short circuit rods made from a first metallic material are sprayed onto the shaft body together with the second metallic material, so that the squirrel cage is connected completely with a material-bonded connection, so that this is safeguarded against centrifugal forces which occur during operation, for instance.

In a further advantageous embodiment, the first metallic material has a conductivity of more than 40 MS/m. For instance, the first metallic material has copper and/or silver. Electrical losses in the rotor are reduced as a result of a high conductivity of this type. Since less waste heat is produced, the rotor can be cooled easily and cost-effectively.

Particularly advantageously the first metallic material is sprayed with a first spraying device and the second metallic material is sprayed with a second spraying device. For instance, the materials are sprayed with, in each case, parameters optimized for manufacture, such as nozzle diameter, particle size, pressure and/or temperature; this results in an improvement in the electrical and mechanical properties of the rotor. The manufacturing time is reduced by using different spraying devices.

In a further advantageous embodiment, the metallic materials are sprayed in a rolling manner onto the substantially cylindrical outer surface of the shaft body. Spraying in a rolling manner means that the shaft body is rotated about its axis of rotation, while the spraying device is moving parallel to the axis of rotation. Since the spraying device is not moved in the peripheral direction, it is ensured that the spraying particles strike the outer surface of the shaft body at a constant angle. Furthermore, the spraying in a rolling manner is not only precise but time-efficient, since the spraying device which moves rigidly in the axial direction rarely requires realignment.

Particularly advantageously the spraying of the metallic materials in a rolling manner is carried out alternately and/or on an evolvent path. Alternate spraying in a rolling manner means that the shaft body is at a standstill while the spraying device moves in the axial direction and in the process the solid body particles are sprayed. The shaft body is then rotated about a small step angle, while the spraying process is interrupted. The solid body particles are then reapplied in a path which runs immediately adjacent and parallel to the axis of rotation, while the shaft body is at a standstill. Alternate spraying in a rolling manner can be realized easily. Spraying in a rolling manner onto an evolvent path means that the shaft body, contrary to the alternate spraying, likewise moves while the spraying device moves in the axial direction and in the process the solid body particles are sprayed. Spraying in a rolling manner onto an evolvent path accelerates the manufacturing method. A groove slope, in a squirrel cage rotor, for instance, can be realized easily.

In a further advantageous embodiment, a third material is sprayed in this way so that the metallic materials are arranged insulated from one another. For instance, a rotor with an electromagnet, which has exciter windings, can be produced with a thermal spraying method. A method of this type, for instance with respect to the number of poles, the conductor cross-sections and the number of windings, is flexible and easy as a result of reducing the number of method steps.

Particularly advantageously at least two materials of the coating are connected in a form-fit manner. A form-fit connection of this type can be produced for instance by way of an in particular sawtooth-shaped rib structure. The rotor is additionally stabilized by a form fit.

BRIEF DESCRIPTION OF THE DRAWING

The invention is described and explained below in more detail on the basis of the exemplary embodiments shown in the Figures. The drawings show.

DETAILED DESCRIPTION OF PREFERRED EMBODIMENTS

The exemplary embodiments explained below are preferred embodiments of the invention. In the exemplary embodiments, the described components of the embodiments in each case represent individual features of the invention which are to be considered independently of one another and which further develop the invention in each case also independently of one another and are thus also to be considered, individually or in a different combination to that shown, as a component part of the invention. Furthermore, the described embodiments can also be extended by further features of the invention which are already described.

The same reference characters have the same meaning in the various figures.

Figure 1:
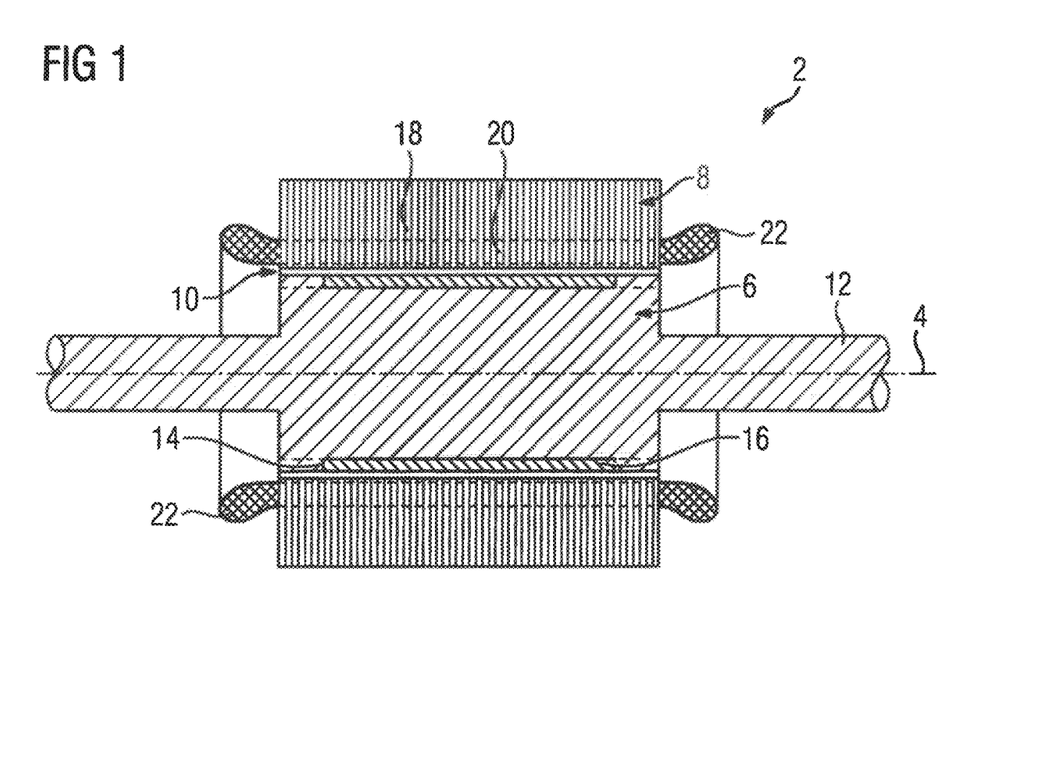
FIG. 1 a longitudinal section of an electric rotating machine.

FIG. 1 shows a longitudinal section of an electric rotating machine 2, which is embodied as an asynchronous machine. The asynchronous machine has a rotor 6 which can be rotated about an axis of rotation 4 and a stator 8 which surrounds the rotor 6. A gap 10, which is embodied in particular as an air gap, is located between the rotor 6 and the stator 8. The axis of rotation 4 defines an axial direction, a radial direction and a peripheral direction. The rotor 6 comprises a solid shaft body 12 with a coating 14, which has a magnet pole-generating element. The magnet pole-generating element is configured as a squirrel cage 16. Alternatively, the electric rotating machine 2 is embodied as an asynchronous machine, wherein the rotor 6 of the synchronous machine has permanent magnets or poles with exciter windings as a magnet pole-generating element. The stator 8 comprises a magnetic field-guiding stator element 18, which is embodied as a laminated core for suppressing eddy currents, and a stator winding 20, which embodies winding heads 22 at the axial ends of the stator laminated core.

Figure 2:
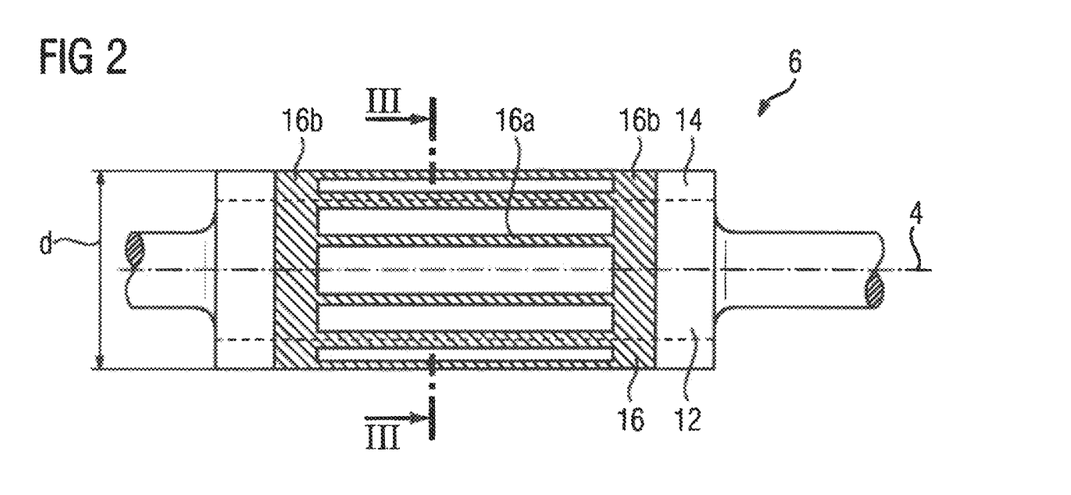
FIG. 2 a side view of a rotor with a squirrel cage.

FIG. 2 shows a side view of a rotor 6 with a squirrel cage 16. The squirrel cage 16 has short-circuit rods 16a, which are connected at their axial ends by way of a short-circuit ring 16b in each case. The coating 14 is applied with a thermal spraying method and is configured so that the rotor 6 is substantially cylindrical and the squirrel cage 16 is embedded completely into the coating 14 of the rotor 6. Thermal spraying methods are for instance arc spraying, plasma spraying, flame spraying or cold gas spraying. The solid shaft body 12 is produced from a soft-magnetic material. The coating 14 comprises a first metallic material and a second metallic material, wherein the second metallic material is a soft-magnetic material and substantially corresponds to the soft-magnetic material of the shaft body 12. The first metallic material of the squirrel cage 16, for instance copper or a copper alloy, has a conductivity of more than 40 MS/m. The coating 14, which surrounds the squirrel cage 16, is further connected at least with a material-bonded connection with the shaft body 12 by means of the thermal spraying method, so that the rotor 6, which has a diameter d of at least 30 cm, can be operated with a power of at least 1 MW and a rotational speed of at least 10,000 rpm. For instance, with cold gas spraying, solid body particles which are accelerated by way of a gas flow strike the shaft body 12 with a high kinetic energy of this type so that a material-bonded connection is produced by way of diffusion mechanisms. The further embodiment of the rotor 6 in FIG. 2 corresponds to that in FIG. 1.

Figure 3:
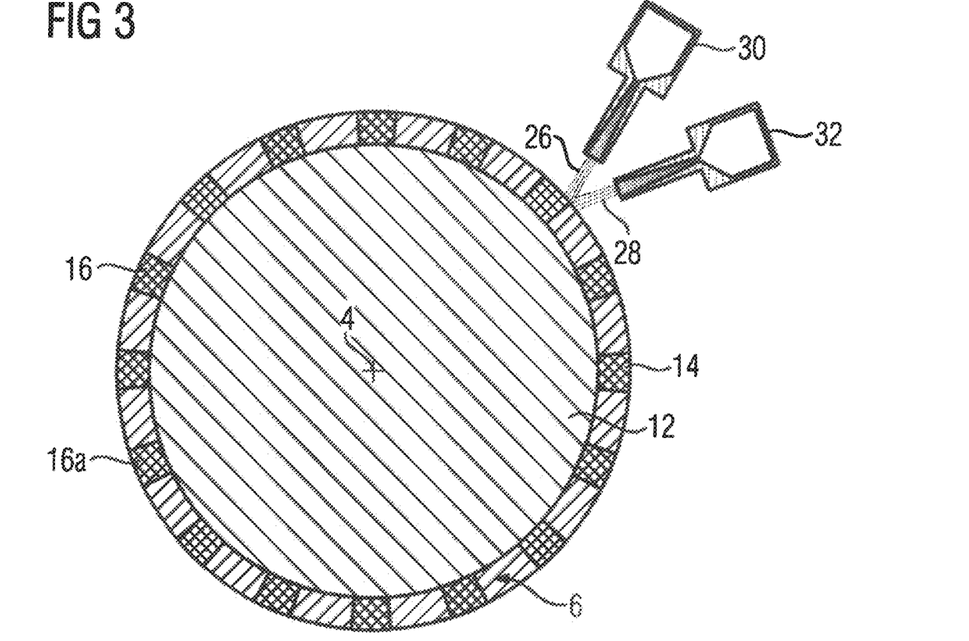
FIG. 3 a cross-section of a first embodiment of a rotor with a coating.

FIG. 3 shows a cross-section of a first embodiment of a rotor 6 with a coating 14. The coating 14 comprises metallic solid body particles, which are sprayed by means of cold gas spraying onto the substantially cylindrical outer surface 24 of the shaft body 12. The coating comprises solid body particles made from a first metallic material 26 and solid body particles made from a second metallic material 28, wherein the first metallic material 26 and the second metallic material 28 are sprayed directly onto the substantially cylindrical outer surface 24 of the shaft body 12 with a first spraying device 28 and a second spraying device 32 in each instance. The squirrel cage 16 is, as in FIG. 2, formed from solid body particles of the first metallic material 28. The second metallic material 28, as in FIG. 2, is a soft-magnetic material, for instance steel, and corresponds substantially to the soft-magnetic material of the shaft body 12. The squirrel cage 16 is embedded completely into the rotor 6. At least the short-circuit rods 16a of the squirrel cage 16 have cross-sectionally a circular ring sector-shaped contour. The contour is approximately rectangular or square. Such a rectangular or square contour of the conductor of the squirrel cage 16 achieves a high current compatibility. The further embodiment of the rotor 6 in FIG. 3 corresponds to that in FIG. 2.

Figure 4:
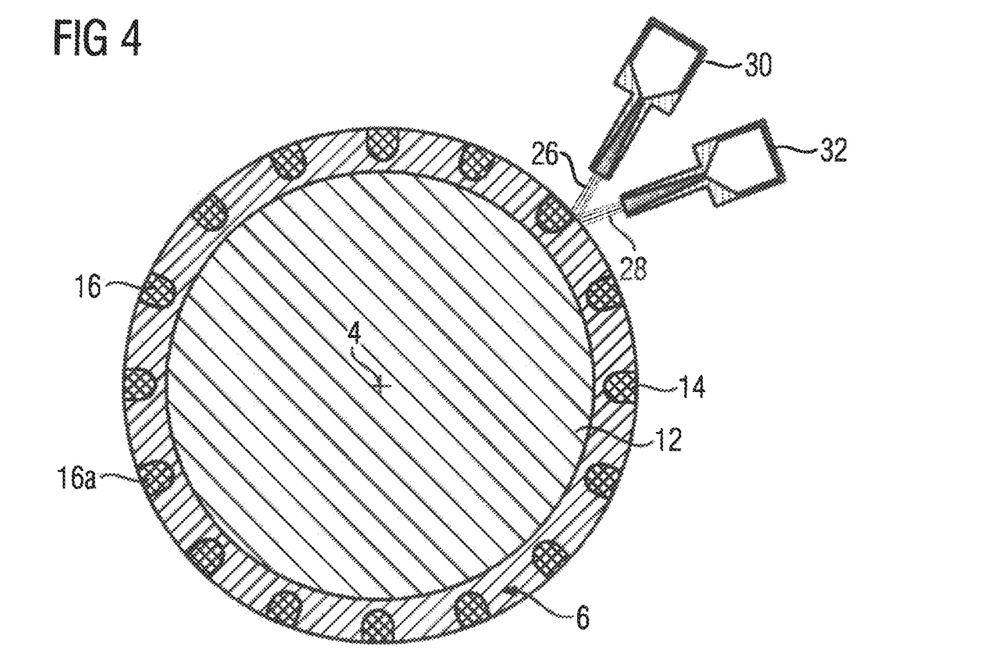
FIG. 4 a cross-section of a second embodiment of a rotor with a coating.

FIG. 4 shows a cross-section of a second embodiment of a rotor 6 with a coating 14, wherein at least the short-circuit rods 16a of the squirrel cage 16 have a rounded contour cross-sectionally. By way of example, the contour of the short-circuit rods 16a are shown in a U shape. The squirrel cage 16 is embedded completely into the coating 14 of the rotor 6. The further embodiment of the rotor 6 in FIG. 4 corresponds to that in FIG. 3.

Figure 5:
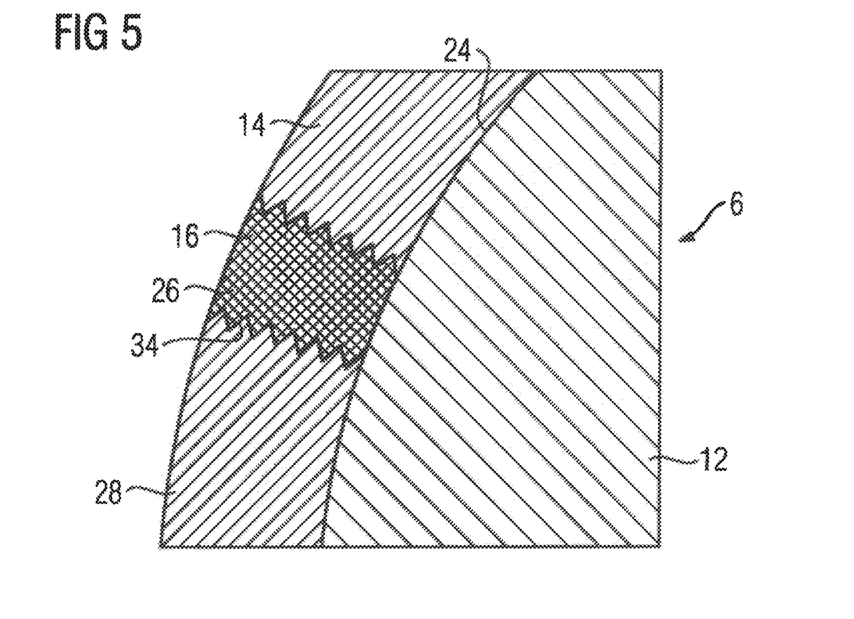
FIG. 5 an enlarged cross-section of a third embodiment of a rotor with a coating, FIG. 6 an enlarged cross-section of a fourth embodiment of a rotor with a coating, FIG. 7 a schematic representation of a first method for producing a rotor and FIG. 8 a schematic representation of a second method for producing a rotor.

FIG. 5 shows an enlarged cross-section of a third embodiment of a rotor 6 with a coating 14, wherein the first material 26 and the second material 28 are additionally connected in a form fit manner by a, for instance, sawtooth-shaped, rib structure 34. The squirrel cage 16 is embedded completely into the coating 14 of the rotor 6. The further embodiment of the rotor 6 in FIG. 5 corresponds to that in FIG. 3.

Figure 6:
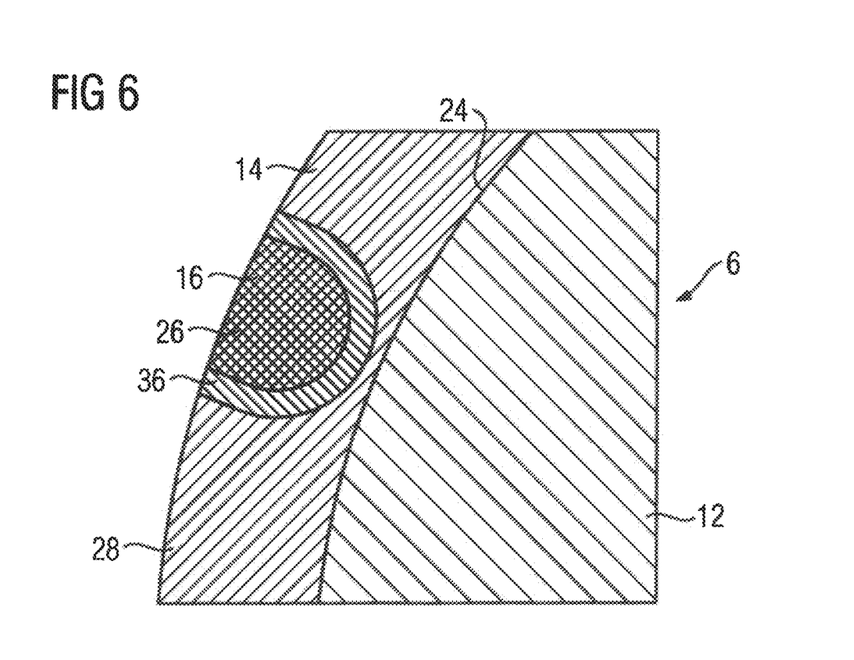

FIG. 6 shows an enlarged cross-section of a fourth embodiment of a rotor 6 with a coating 14, wherein the coating The coating comprises solid body particles made from a first metallic material 26, a second metallic material 28 and a third material 36. The materials 26, 28, 36 are sprayed onto the substantially cylindrical outer surface 24 of the shaft body 12 by means of a different spraying device 30, 32. The spraying devices 30, 32 are not shown in FIG. 6 for the sake of clarity.

The third material 36 is an electrically conductive material, which has silver, brass, zinc or aluminum, for instance, and differs from the first metallic material 26 as a result of its electric, thermal and/or mechanical properties. On account of an electrically conductive third material 36, a mechanical stability of the rotor 6 is improved and/or the losses occurring during operation are reduced, for instance. The third material 36 is assigned to the squirrel cage 16 and connects the first metallic material 26 with the second metallic material 28. Alternatively, the third material 36 is an electrically insulating material, which has aluminum oxide, for instance, and insulates the first metallic material 26 from the second metallic material 28. The further embodiment of the rotor 6 in FIG. 6 corresponds to that in FIG. 4.

Figure 7:
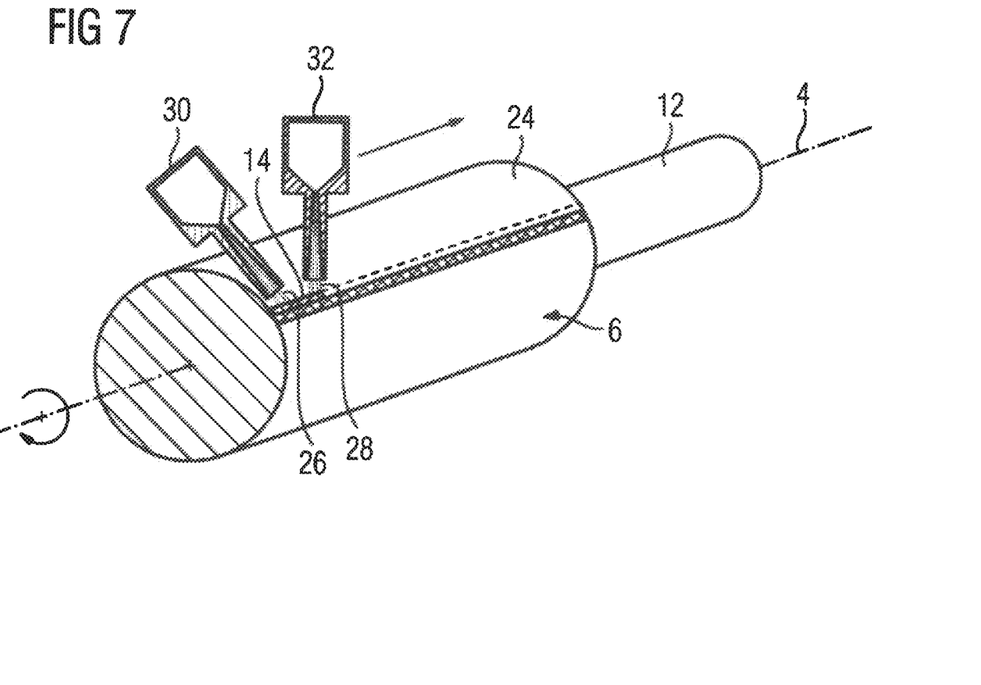

FIG. 7 shows a schematic representation of a first method for producing a rotor 6. The coating 14 of the rotor 6 is sprayed using cold gas spraying by, by way of example, two spraying devices 30, 32 onto the substantially cylindrical outer surface 24 of the shaft body 12, wherein the spraying devices are arranged axially one behind the other and/or adjacent to one another h the peripheral direction.

The spraying devices 30, 32 are operated simultaneously or alternately. The metallic materials 26, 28 of the coating 14 are sprayed in a rolling manner onto the shaft body 12, which means that the shaft body 12 is rotated about its axis of rotation 4, while the spraying devices 30, 32 are moved parallel to the axis of rotation 4. Since the spraying devices 30, 32 are not moved in the peripheral direction, it is ensured that the solid body particle strikes the outer surface 24 of the shaft body 12 at a constant angle of 80° to 110°.

The spraying of the metallic materials 26, 28 in a rolling manner takes place alternately, which means that the shaft body 12 is at a standstill while the spraying devices 30, 32 are moved in the axial direction and in the process the solid body particles are sprayed. The shaft body 12 is then rotated about a small step angle, while the spraying process is interrupted. The solid body particles are then applied again in an immediately adjacent path which runs parallel to the axis of rotation, while the shaft body 12 is at a standstill. The further embodiment of the rotor 6 in FIG. 7 corresponds to that in FIG. 3.

Figure 8:
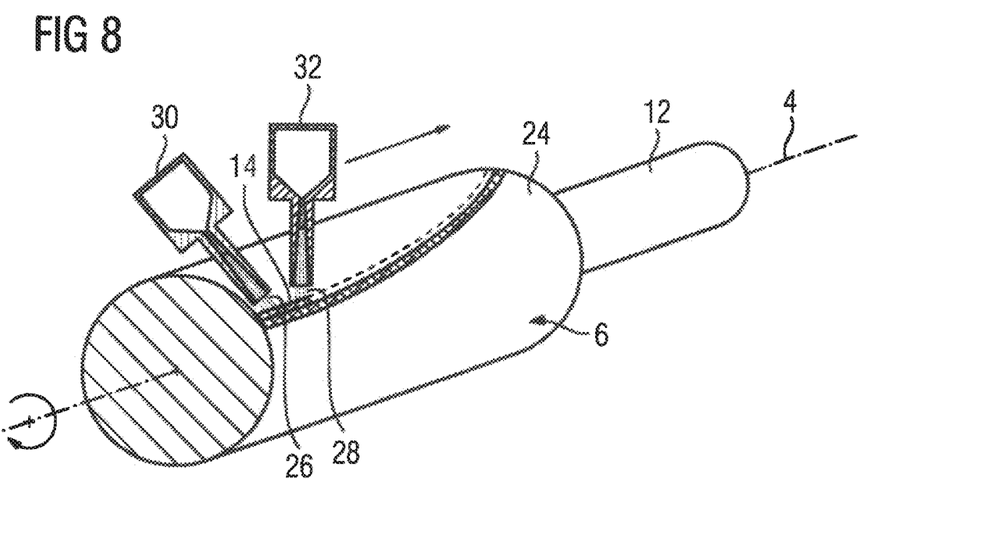

FIG. 8 shows a schematic representation of a second method for producing a rotor 6. The spraying of the metallic materials 26, 28 in a rolling manner is carried out on an evolvent path, which means that, contrary to the alternating spraying, while the spraying devices 30, 32 are moved in the axial direction and in the process the solid body particles are sprayed, the shaft body 12 likewise moves. In order to achieve reproducible results, the movements of the spraying devices 30, 32 and the rotational movement of the shaft body 12 must be synchronized. The further embodiment of the rotor 6 in FIG. 8 corresponds to that in FIG. 7.

In summary, the invention relates to a method for producing a rotor 6 for an electric rotating machine 2 having at least one shaft body 12. In order to specify a production method, which, compared with the prior art, is simpler and more cost-effective, it is proposed that a coating 14 made from at least one first metallic material 26 and a second metallic material 28, which is different from the first metallic material 26, is sprayed onto at least part of a substantially cylindrical outer surface 24 of the shaft body 12 by means of a thermal spraying method, wherein at least one part of a magnet pole-generating element is embodied by means of the coating 14.

The invention claimed is:

1. A method for producing a rotor for an electric rotating machine, said method comprising spraying in a rolling manner a first metallic material and a second metallic material, which is different from the first metallic material, onto at least part of a substantially cylindrical outer surface of a shaft body by a thermal spraying method to form on the shaft body a coating which forms at least part of a squirrel cage, and producing the shaft body from the second metallic material.

2. The method of claim 1, wherein the thermal spraying method includes cold gas spraying.

3. The method of claim 1, wherein the second metallic material is a soft-magnetic material.

4. The method of claim 1, wherein the first metallic material has a conductivity of more than 40 mega Siemens per meter.

5. The method of claim 1, wherein the spraying of the first and second metallic materials in a rolling manner is implemented alternately and/or on an evolvent path.

6. A method for producing a rotor for an electric rotating machine, said method comprising spraying in a rolling manner a first metallic material and a second metallic material, which is different from the first metallic material, onto at least part of a substantially cylindrical outer surface of a shaft body by a thermal spraying method to form on the shaft body a coating which forms at least part of a squirrel cage, wherein the first metallic material is sprayed with a first spraying device and the second metallic material is sprayed with a second spraying device.

7. The method of claim 6, wherein the at least part of the squirrel cage is formed by the first metallic material.

8. The method of claim 6, wherein the squirrel cage is embedded completely into the rotor.

9. The method of claim 6, wherein the thermal spraying method includes cold gas spraying.

10. The method of claim 6, wherein the spraying of the first and second metallic materials in a rolling manner is implemented alternately and/or on an evolvent path.

11. A method for producing a rotor for an electric rotating machine, said method comprising spraying in a rolling manner a first metallic material and a second metallic material, which is different from the first metallic material, onto at least part of a substantially cylindrical outer surface of a shaft body by a thermal spraying method to form on the shaft body a coating which forms at least part of a squirrel cage, and spraying a third material onto at least part of the substantially cylindrical outer surface of the shaft body such as to insulate the first and second metallic materials from one another.

12. The method of claim 11, further comprising connecting at least two of the first and second metallic materials and the third material of the coating in a form-fit manner.

13. A rotor for an electric rotating machine, said rotor comprising:
   a shaft body; and
   a squirrel cape formed by a coating made of a first metallic material and a second metallic material, which is different from the first metallic material, and applied onto at least part of a substantially cylindrical outer surface of the shaft body,
   wherein the second metallic material is a soft-magnetic material, and
   wherein the shaft body is made from the second metallic material, said at least part of the squirrel cage being formed by the first metallic material.

14. The rotor of claim 13, wherein the rotor is configured for operation with a rotational speed of at least 5,000 rpm.

15. The rotor of claim 13, wherein the first metallic material has a conductivity of more than 40 mega Siemens per meter.

16. An electric rotating machine, comprising a rotor and a stator surrounding the rotor with an air gap therebetween, said rotor as claimed in claim 13.

17. A rotor for an electric rotating machine, said rotor comprising:
   a shaft body; and
   a squirrel cage formed by a coating made of a first metallic material and a second metallic material, which is different from the first metallic material, and applied onto at least part of a substantially cylindrical outer surface of the shaft body, wherein the coating includes a third material to insulate the first and second metallic materials from one another.

18. The rotor of claim 17, wherein the second metallic material is a soft-magnetic material.

19. The rotor of claim 17, wherein at least two of the first and second metallic materials and the third material of the coating are connected in a form-fit manner.

\* \* \* \* \*